US010275809B2

(12) United States Patent
Butler (10) Patent No.: US 10,275,809 B2
(45) Date of Patent: Apr. 30, 2019

(54) SYSTEMS AND METHODS FOR ORDERING AND DELIVERING DIGITAL CONTENT (75) Inventor: Jon F. Butler, Salt Lake City, CA (US)

(73) Assignee: MEDIAPORT ENTERTAINMENT, INC., Salt Lake City, UT (US)

(*) Notice: Subject to any disclaimer, the term of this patent is extended or adjusted under 35 U.S.C. 154(b) by 779 days.

(21) Appl. No.: 12/172,572

(22) Filed: Jul. 14, 2008

(65) Prior Publication Data
US 2009/0053992 A1 Feb. 26, 2009

Related U.S. Application Data (63) Continuation-in-part of application No. 11/773,540, filed on Jul. 5, 2007, now Pat. No. 9,189,792.

(51) Int. Cl.
G06Q 30/06 (2012.01)
G06Q 20/18 (2012.01)
G06Q 20/20 (2012.01)
H04L 29/08 (2006.01)

(52) U.S. Cl.
CPC ............ G06Q 30/06 (2013.01); G06Q 20/18 (2013.01); G06Q 20/202 (2013.01); H04L 29/08225 (2013.01); G06Q 2220/10 (2013.01)

(58) Field of Classification Search
None
See application file for complete search history.

(56) References Cited

U.S. PATENT DOCUMENTS

| | | | | |
|---|---|---|---|---|
| 5,959,945 A * | 9/1999 | Kleiman | | 381/81 |
| 6,308,887 B1 * | 10/2001 | Korman et al. | | 235/379 |
| 6,318,536 B1 * | 11/2001 | Korman et al. | | 194/217 |
| 7,302,465 B2 * | 11/2007 | Ayres et al. | | 709/203 |
| 7,949,606 B1 * | 5/2011 | Sweet | | G06Q 30/06 705/51 |
| 2002/0062385 A1 * | 5/2002 | Dowling | | G06Q 20/04 709/230 |
| 2002/0161476 A1 * | 10/2002 | Panofsky | | G06Q 20/1235 700/231 |
| 2003/0061164 A1 * | 3/2003 | Muhammad | | G06F 21/10 705/52 |
| 2004/0002385 A1 * | 1/2004 | Nguyen | | G07F 17/32 463/42 |
| 2004/0098740 A1 * | 5/2004 | Maritzen | | G06Q 20/00 725/27 |

(Continued)

Primary Examiner — Jamie R Kucab
(74) Attorney, Agent, or Firm — Loza & Loza, LLP; Tyler J. Barrett (57) ABSTRACT Systems and methods for delivering digital content to user who have pre-selected the digital content before they arrive at a device for distributing the digital content are described. The systems contain a storage device where the digital content is stored, a device for distributing the digital content to a user, a receiving device for receiving the digital content that has been distributed, and means for communicating with the user who is not located at the distribution device. The communication means allows the user to browse and/or purchase the digital content prior to arriving at the distribution device. As well, by purchasing the content before arrival, if the digital content is not located at the distribution device, it can be transferred from the storage device to the distribution device before the arrival of the user. Other embodiments are described.

12 Claims, 4 Drawing Sheets

Figure 4

(56) References Cited

U.S. PATENT DOCUMENTS

2004/0158741 A1\* 8/2004 Schneider ............ G06F 21/562
726/24
2013/0073406 A1\* 3/2013 Gazdzinski ............ G06Q 10/08
705/21

\* cited by examiner

SYSTEMS AND METHODS FOR ORDERING AND DELIVERING DIGITAL CONTENT

CROSS-REFERENCE TO RELATED APPLICATIONS

This application is a continuation-in-part of U.S. patent application Ser. No. 11/773,540, filed Jul. 5, 2007, the entire disclosure of which is hereby incorporated by reference.

FIELD

This application relates generally to systems and methods for delivering digital content to a purchaser. In particular, this application relates to systems and methods for delivering digital content to purchasers who have pre-selected the digital content before they arrive at a device for distributing the digital content.

BACKGROUND

Many types of information and content are now stored digitally, including books, music, movies, software programs, video games, databases, advertisements, as well as other content. Because such content is stored digitally, it can be transferred easily using many types of electronic networks. See, for example, U.S. Pat. Nos. 5,875,110, 4,412,292, 5,848,398, 6,397,189, 6,381,575, 4,674,055, 5,445,295, 5,734,719, 6,286,029, 6,799,165, 6,655,580, 6,330,490, 6,662,080, 6,535,791, 6,711,464, 5,237,157, 6,654,757, 5,794,217, and 6,748,539. Both private and public electronic networks, including the Internet, are frequently used to transfer the digital content.

Often the digital content is transferred electronically so that it can be sold to a user who is not located where the digital content is originally stored. The digital content can be sold for a variety of purposes, including education, entertainment, research, or other purposes. The digital content may be sold in any number of technological formats known in the art that permit storage and retrieval of the digital data, including floppy discs, compact discs (CDs) of several varieties; video discs of several varieties, including digital video discs (DVDs); magnetic storage devices using a variety of forms and technologies; and solid state devices of several varieties.

Most digital content sales have been to users of computers that are connected to each other via electronic networks of various types, e.g., the Internet. But users are not always located at such a computer when they desire to purchase the digital content, or they have a computer but it is not connected to such a network. Consequently, sales (including rentals) of digital content have begun using devices in remote locations, including stand-alone devices (such as kiosks) in retail or other high-traffic areas. The stand-alone devices may be attended or unattended. But while sales of digital content at kiosks have increased lately, so has the time waiting in line for other users who are either purchasing and/or interacting with the kiosk.

SUMMARY

This application describes systems and methods for delivering digital content to users who have pre-selected the digital content before they arrive at a device for distributing the digital content. The systems contain a storage device where the digital content is stored, a device for distributing the digital content to a user, a receiving device for receiving the digital content that has been distributed, and a communications link with the user who is not located at the distribution device. The communications link allows the user to browse and/or purchase the digital content prior to arriving at the distribution device. As well, by browsing/purchasing the content before arrival, if the digital content is not located at the distribution device, the system can transfer the digital content from the storage device to the distribution device before the arrival of the user.

BRIEF DESCRIPTION OF THE DRAWINGS

The following description can be better understood in light of the Figures, in which.

Together with the following description, the Figures may demonstrate and explain the principles of the systems and methods for delivering digital content to a user. In the Figures, the thickness and configuration of components may be exaggerated for clarity. The same reference numerals in different Figures represent the same component.

DETAILED DESCRIPTION

The following description provides specific details in order to provide a thorough understanding. The skilled artisan, however, would understand that the systems and methods can be practiced without employing these specific details. Indeed, the systems and methods can be practiced by modifying the illustrated system and method and can be used in conjunction with apparatus and techniques conventionally used in the industry. While the systems and methods are described for use with a kiosk as a distribution device, the distribution device could include other types of devices, such as vending machines, automated teller machines, coin- or card-operated communications machines (e.g., telephone machines/booths), or remote terminals located in a secure or unsecured public space such as a library, hallway, or outdoor vending area.

The systems contain a storage device in a first location where the digital content can be stored, a distribution device in a second location for delivering the digital content to a user, a receiving device for receiving the digital content that has been distributed, and means for communicating with the user who is optionally not located at the device. In some embodiments, the systems for delivering the digital content can be illustrated in FIG. 1. As depicted in that Figure, the system 5 contains a first (or storage) device in a first location that stores the digital content and transfers the digital content to a second (or distribution) device in a second location. The digital content is then distributed from the second device to a user via a receiving device.

Prior to discussing the details of system 5, it should be understood that the following description is presented largely in terms of steps and operations that may be performed by conventional computer components. These computer components, which may be grouped in a single location or distributed over a wide area, generally include computer processors, memory storage devices, display devices, input devices, etc. In circumstances where the computer components are distributed, the computer components are accessible to each other via communication links, such as those illustrated in FIG. 1. The system 5 could equally operate within a computer system having a fewer or greater number of components than those illustrated in FIG. 1. Thus, the depiction of system 5 should be taken as illustrative and not limiting. For example, the system 5 could implement various services components and peer-to-peer network configurations to implement at least a portion of the processes.

The first location can be located anywhere desired by the operator, i.e., in a central location (with central not referring to the geographic location). The first device acts as a repository for any desired digital content. The first device also permits an operator or administrator of the system 5 to manage all of its operations at a centralized location, permitting roll-out of digital content (and the related materials described herein) across all or select distribution devices and real-time feedback from each distribution device as to its use and functionality.

Any device that can operate in this manner can be used as the first device. One example of the first device comprises a server 10. Any type of server known in the art can be used as server 10. Examples of servers that can be used include a computer running a UNIX-style operating system, a computer running a Microsoft Windows operating system, or a personal computer workstation. The server 10 comprises any storage component on which the digital content can be stored. Examples of storage components include optical storage discs, DVD-RAM discs, and traditional magnetic hard disc drives.

Another example of a storage component includes any known database (or combination of databases). The database stores information regarding the digital content and any user interaction with the system. For example, the database stores data regarding the content inventory at each of the distribution devices. The database can also store sales information, user information, and transactional information. The database may be a Microsoft SQL database, a Microsoft Access database, an Oracle database, a MySQL database or combinations thereof. In some embodiments, the server can contain a kiosk database 32 (or module of a database) for managing and monitoring the distribution devices (kiosks) and a digital content database 34 (or module of a database) for managing and monitoring the digital content.

In some aspects, multiple servers 12 may be connected together to make a server cluster. Using a server cluster permits sharing information regarding the content stored on each server 10 and each transaction the server 10 has recorded. By using a server cluster, the system 5 is always operational, regardless of the location of a particular component on the network that connects the components (such as the Internet). The server cluster can contain a primary cluster, which handles all critical tasks, with minor functions being routed to a secondary cluster. With this configuration, if the primary cluster is not operational, most functions can be handled by the secondary cluster. A server cluster also allows for large-scale deployment and interoperability, as well as data that can be stored on the network in multiple points of co-location.

The software components required for operating the server 10 may be included on a single server or on multiple servers, with each server implementing one or more tasks and communicating among themselves using standard networking protocols. Non-limiting examples of the server-focused tasks using the software components that may be implemented on one or more servers 10 include those of e-mail server; Web server; file server; purchase transaction authentication server; transaction push server; monitoring server; content management server; content synchronization server; content security server; and advertising/promotional message server.

Figure 1:
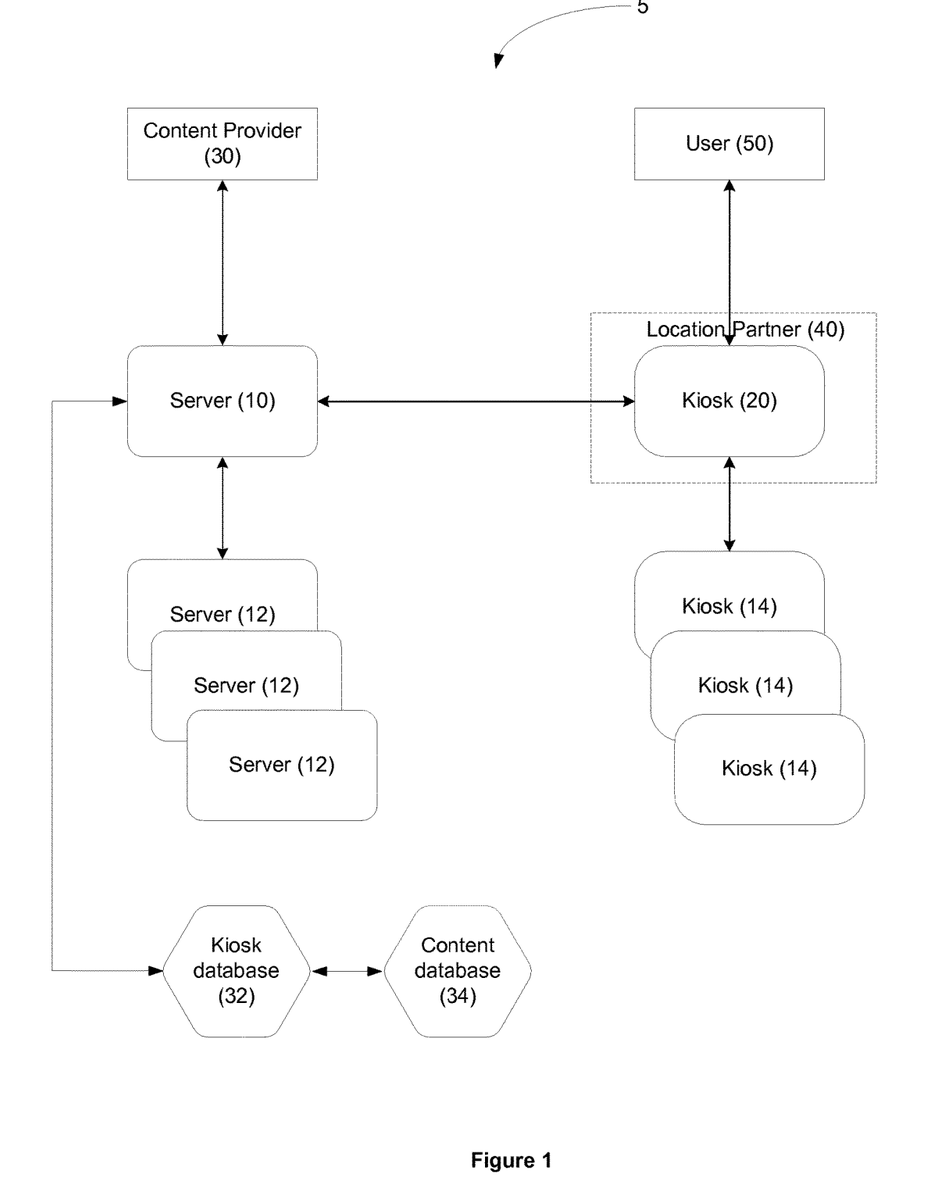
FIG. 1 depicts an exemplary system for delivering digital content to a user.

As depicted in FIG. 1, the server 10 manages and stores digital content. The types of digital content that can be stored (and then delivered to a user) are virtually unlimited. Examples of the digital content include music, movies, video games, software, mobile phone ring tones, electronic books, advertising, and other types of content. The format in which the digital content is stored is also virtually unlimited. Examples of the types of digital formats include pdf, doc, xls, jpeg, tiff, gif, xbm, pnm, mpeg2, mpeg4, mp3, oma, m4a, wma, wmv, mov, wav, and avi, as well as combinations thereof. The digital content can also be provided in any known language.

The digital content may be provided internally (by the entity that controls or operates the system 5), or externally by one or more third parties that are the copyright owners of the content or that act on behalf of the owners of the content (collectively, content providers 30). Non-limiting examples of content providers 30 include music publishers, video publishers, recording companies, movie studios, television studios, book publishers, artists, performers, end-users, mobile telephone companies, video game manufacturers, and advertisers. Content providers 30 may provide the content to the server using any known mechanism, including via wired or wireless network connections known in the art or via other methods, such as merely providing a CD or DVD to the operator of the system. In some embodiments, the content providers 30 can provide the digital content to a distribution device(s), which can then be transferred to the server 15.

Optionally, the digital content can contain instructions indicating how the content may be used, distributed, sold, transmitted, or otherwise processed (use instructions). The server 10 can convert such use instructions into digital rights management (DRM) information that can be associated with any desired content. The DRM information may include any number or combination of restrictions, including those that are enabled by a DRM technology and that are selected by a content provider 30. Non-limiting examples of DRM restrictions include a restriction that visual or textual content not be printed in hardcopy; a restriction that copy-and-paste functions are disabled for textual content; a restriction that a music file may not be played after a certain date; a restriction that a music file or video file may only be played a fixed number of times; and a restriction that a file may only be copied to another device a fixed number of times. Other examples include variable pricing, variable billing, and variable payment methods.

The DRM information may be provided by a third party (such as content provider 30 or location partner 40) or by the operator of the system 5. Either may assign a unique transactional ID to each piece of digital content. This unique transactional ID correlates to a set of use instructions and DRM specifications to control how the associated content is managed on devices, such as on the server 10, as described herein. The digital content may therefore contain metadata (i.e. metatags), use instructions, and a transactional ID.

The metadata (i.e., metatags) can correspond to information about any desired content, such as a genre of music or movie, an artist, a content provider, content release date, or otherwise. The metatags may be provided by a content provider 30, location partner 40, or created by the operator of the system. The metatags may indicate the use instructions for all content that is provided, with distinct use instructions for each piece of content, or with use instructions based on parameters that can be used to classify content. In one example of use instructions, a content provider 30 may indicate that music performed by musical artist A may be redistributed freely, without restriction, music performed by musical artist B may be redistributed freely when purchased at a set price, and music performed by musical artist C may be redistributed in a manner that permits the music to be copied to another computer three times, after which the music may not be copied to another computer, but only played (performed) on a computer where it is stored.

The digital content may optionally be encrypted in a manner to increase security of the content during storage on a server 10 or on a distribution device, or during transfer between a content provider 30 and a server 10, between a server 10 and the distribution device, or between the distribution device and the receiving device. Any number of encryption methods known to those in the art may be used to implement this feature. Examples of such encryptions include both symmetrical and asymmetrical encryption using a variety of methods, including RSA, DES, Triple DES, AES, Blowfish, ElGamal, RC4, and others.

When the distribution device is placed in a location that is remote from the first device, a location partner 40 can optionally be used in the system 5 as depicted in FIG. 1. The location partner 40 comprises an individual or entity that provides a space where the delivery device may be physically located. Non-limiting examples of such location partners include owners or managers of airports, bars, clubs, schools, gyms, stadiums, arenas, amusement parks, military bases, retail centers or shops, libraries, universities, and eating establishments.

A location partner 40 may provide this space without charge, as a service to individuals that visit the space where the delivery device is placed. Or the location partner 40 may provide this space in exchange for a fee of some type, or in exchange for advertising time or space on the distribution device, or for other benefits. In some embodiments, the location partner 40 may control or limit the content that is available via the distribution device. In other embodiments, the location partner can also control the advertising at the distribution device.

As described above, the system also contains a distribution device that can be located in a second location that is optionally remote from the first location. The distribution device receives the content from the first or storage device and then distributes that content to a user (i.e., a purchaser). Any device operating in this manner can be used as the distribution device. In some embodiments, the distribution device comprises any known vending machine or any known kiosk, such as the kiosks described herein.

The kiosk provides a point-of-sale (or rental) experience for any user, including both actual and merely potential purchasers of the digital content. Any person can be a user by interacting with the kiosk, whether by purchasing content or merely viewing the kiosk and/or the content on the kiosk, such as by sampling music contained in the kiosk. The kiosk used in the system can be any kiosk known in the art or the kiosk described below. In some embodiments, the kiosk may physically display any known advertising, such as posters, banners, or adhesive advertisements. The kiosk may also be used in conjunction with products as a point-of-purchase display.

The kiosk can contain any combination of number of video displays. In some embodiments, the kiosk contains two video displays, a first video display that displays advertising messages and a second video display that displays menus, samples of content, and related information appropriate to affect a purchase by an end-user of the content made available through the kiosk. In other embodiments, though, the kiosk can contain only one video display, as well as three or more video displays. The video display can comprise any known displays, including LED displays, TFT displays, LCD displays, CRT displays, touchscreens, and combinations thereof.

The kiosk can also contain multiple input and output devices appropriate to interact with a user, display or perform the content stored on the kiosk, and complete a sales transaction related to the content. These input and output devices may include, for example, one or more of any of the following: a keyboard; a mouse; a trackball; a joystick; a touchscreen; a label maker; an automatic coupon feeder; a barcode scanner; an image scanner; biometric scanning devices such as a fingerprint, voiceprint, hand geometry, or retinal/iris scanner; a Compact Disc reader; a Compact Disc writer; a video disk reader; a video disk writer; and media device connectivity, including a USB port, an IEEE-1394 FireWire port, a SecureDigital (SD) port, a CompactFlash port, a PCMCIA port, a MemoryStick port, a laser printer, a receipt printer, a video camera, a camera, an audio recorder, a credit/debit/gift card reader, a cash acceptor, a coin acceptor, a check acceptor, a jewel case ejector, a phone docking station, speakers, voice recognition device, signature verifier, facial recognition device, Braille input device, bubble sheet/multiple choice form scanner (such as a Scantron machine), Bluetooth communications, Wi-Fi communications, Wi-Max communications, and other input or output device known in the art. Furthermore, additional input, output, and storage technologies known in the art may be integrated with the kiosk, including any and all mobile or portable devices.

The kiosk can also include a controlling device that operates the video displays, interacts with input and output devices, and communicates with other kiosks or servers 10, in real-time or as needed. In some embodiments, the controlling device includes two or more computers, either sharing or dedicated to the needed tasks requisite to controlling operation. In some configurations, one computer handles the display, selection, and processing of content purchase transactions and a second computer handles the remainder of the tasks required of the kiosk.

Figure 2:
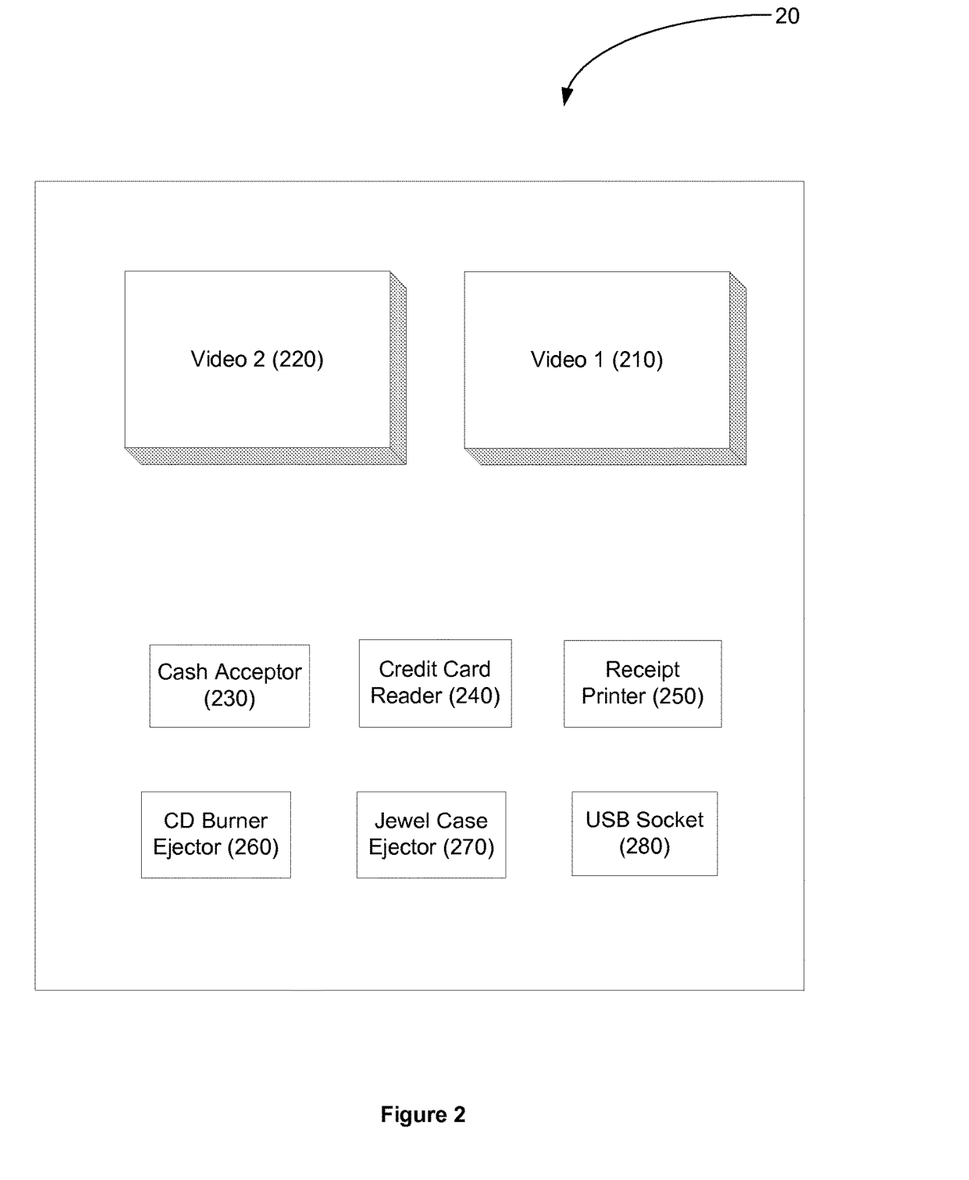
FIG. 2 illustrates the components in some embodiments of an exemplary distribution device.

FIG. 2 illustrates one example of kiosk. In FIG. 2, kiosk 20 contains a video display 210 on which advertising or promotional messages are displayed; a video display 220 comprising a touch screen device through which a user may view and select content; a cash acceptor 230 through which a user may make payment for content; a credit card reader 240 through which a user may make payment for content; a receipt printer 250 that dispenses a paper receipt of a transaction when content is purchased; a CD burner ejector 260 that dispenses an audio CD containing content selected by a user during a purchase transaction; a jewel case ejector 270 that dispenses an empty jewel case for holding an audio CD; and a USB socket 280 to which a user may connect a receiving device for delivery of content, as described herein. As noted previously, a kiosk 20 may contain different—or additional—components than those shown in FIG. 2, including an end unit that comprises a mobile or portable device.

In some embodiments, the video displays of the kiosk 20 incorporate known touch screen technology. Thus, it can provide a user interface that presents a visual display of pertinent information during the interaction and distribution processes, as well as operate as a user interface for entry of user commands. In some embodiments, the kiosk 20 also includes any known audio technology, such as speakers or headphones.

The kiosk 20 can include a user-friendly interface, including a graphical user interface with a touch screen capability. If desired, multiple interfaces can be incorporated in the kiosk situated at high traffic locations, such as by being positioned on each side of the kiosk. The user interface comprises a hierarchy of pages that a user navigates through to accomplish different tasks. For example, a user may search for a specific song, title or artist; once the user's selection is found, the selection may be sampled, and eventually purchased. The same process applies to all digital content types where a user can interact with the kiosk 20 to accomplish different tasks associated with the content.

When a user purchases content through a kiosk 20, that content is made available to the user using any receiving device known in the art. The receiving device can be provided by the kiosk 20 or can be provided by the user. Non-limiting examples of some content receiving devices can include playback devices or storage devices. Examples of the playback devices include portable computers, MP3 players, iPods®, video players, or mobile/cellular phones. Examples of the storage devices include portable computers, mobile/cellular phones, pagers, text messaging devices, calendar or text information devices, recordable media such as memory chips and cards, CDs and DVDs (or similar video or data discs), writeable data CD such as WORM or CD-RAM, flash drives, USB sticks, or flash memory storage devices. The digital content may be stored on these receiving devices magnetically, optically, or electronically as well as any other storage mode known in the art. In some aspects, the digital content can be placed on a receiving device, along with migrated plug-ins or software that can be used to play the digital content received.

The various components of the system can be electronically connected to each other using any means known in the art. In some embodiments, the system 5 contains a computer network. Computer networks are well known in the field of communications. Computer networks may include communication links that extend over a local area or a wide area, or even be global. Examples of these connections include Ethernet, frame relay, DSL, satellite uplink, cable modem, analog modem, fiber channel, infrared and microwave transmissions, wireless communications of various types, and other wired or wireless networking technologies known in the art. Such connections may also be constructed through a publicly accessible network, such as the Internet, so long as appropriate security measures, as are known in the art, are used to prevent unauthorized access to the content that passes across the connection. A private network connection may also be used in order to reduce the reliance on such security measures and to further ensure the integrity of content that is transferred via this connection.

The various components of the system are able to communicate with each other whenever needed. In some embodiments, the server 10 and any kiosk 20 may communicate at regular or scheduled intervals, in real-time, or in an ad hoc manner according to needs that arise as determined by the server 10 or the kiosk 20. Since actual real-time communication may be limited by the transmission speeds available, the communication may be on a substantial or near real-time basis.

In some embodiments, the various components of the system need not be electronically connected. For example, the kiosk 20 need not be connected to the server 10 on a continuous basis. Rather, the kiosk can operate in a stand-alone mode, with digital content being transferred to the kiosk 20 via non-networked means, and purchase transactions and data being collected via non-networked, intermittent means. A stand-alone kiosk 20 can be used, for example, when security procedures or network connectivity are not available, such as a kiosk 20 located on a military base in a different country than the server 10 from which it would otherwise receive content.

The systems described above can be used to transfer the digital content from the first device to the distribution device, where it then can be optionally distributed to an individual user via the receiving device. While the digital content can be transferred by the system in any manner, in some aspects, it can be transferred in a semi-dynamic manner, dynamic, or even static manner. The digital content can also be transferred to any distribution device (or group of devices) at once or one at a time.

When the digital content is transferred from the server to the kiosk, the operator of a server 10 may customize which content (or category, group of content, or advertising) is transferred, customize which content is transferred from a server 10 to a particular kiosk 20 (or to a collection of multiple kiosks 14), as well as customize the billing.

When a user views the kiosk, purchases content, or otherwise interacts with the kiosk, the kiosk may collect any desired type of data (collected data). Some examples of collected data may include data about the individual user (user data), data about the user's interaction with the kiosk (kiosk data), data concerning the demographics of the kiosk location (location or demographic data), and so forth. The kiosk (or other distribution device) may collect the data in any manner known in the art.

For example, during the user's interaction with the kiosk, the kiosk may gather user data. User data may include any information that relates to the user and/or the user's activities. One example of user data may include conversion data, such as pages viewed, images viewed, color schemes viewed, time of viewing, time of viewing in relation to purchase, content or item(s) purchased/downloaded, requests made, demos/games played, registrations, signups, advertisements viewed, and so forth. Another example of user data may include user browsing activities, such as content viewed, content selected, time spent viewing different content, and total interaction time. Yet another example of user data may be demographic information, such as the user's age, sex, ethnicity, race, marital status, household size, schooling/education, income, profession, languages spoken, citizenship, and the like. Still another example of user information may include survey data, such as consumer satisfaction surveys, event expectation surveys, post-event evaluation surveys, polling/voting data, and so forth. Another example user data may include user preference data, such as user selected color schemes, content preferences, advertisement preferences, e-mail preferences, and the like. Another example of user data includes user-indicated items of interest, such as forms and genres of entertainment and hobbies. In yet another example, user data may include user account information, such as username, password, address, phone number, e-mail address, unique login identifiers, cookies, user specific survey/conversion data, etc. In still another example, user data may include biometric data, such as fingerprints, voiceprints, hand geometries, retinal/iris scans, signature verifications, facial recognitions, video feed of end-user, pictures taken of end-user, audio recordings, and the like. Moreover, additional information may be collected and/or extrapolated from the any information/data that has been input by the user.

In some embodiments, the data obtained from the user can include the user's email account. That account can be used to further customize the kiosk experience for the user. As well, that email account can be used to allow the user to receive additional electronic advertising, including notices of upcoming content, events, products, and similar topics. The user's email account may also be used when sharing the information among a community to which the user belongs. In some instances, the user can have a membership whether or not the user has an email account. For those users having a membership, the interaction can be customized. The member can enter his/her membership when prompted and can then be presented with customized menus based on past interaction/sales patterns.

The collected data also includes kiosk data. The kiosk data can include any of the user's interaction with the kiosk including, as non-limiting examples, the following: the areas of the content navigation system visited by the end-user; the advertising content displayed immediately prior to and during the end-user's interaction with the kiosk; the advertising content displayed immediately prior to and during the end-user's purchase from the kiosk; the nature of the delivery device selected by the end-user; method of payment, and others. For instance, the kiosk data may also include sales transaction data, which may indicate purchases contemplated or completed by the end-user, content sold, content price, royalty information, license numbers, inventory ID numbers, transactional IDs, etc.

The collected data may also include location or demographic data. The location data may relate to the demographic environment at the location of the remote device, i.e., print/design advertising or products associated with remote device, kiosk location, seismic/meteorological activity, local advertisements, local artists, local event calendaring, and so forth.

The collected data also includes financial data. The financial data may include sales transaction data, which may indicate purchases contemplated or completed by the user, content sold, content price, royalty information, inventory ID numbers, transactional IDs, etc. Examples of other types of financial data include payment information, sales information, credit/debit/gift card information, promotional/discount codes, accounting information, and so forth.

The kiosk can operate in either a continuous or a batch mode. In the continuous mode of operation, the collected data for each transaction is transmitted quickly from the kiosk to the server. Then, the collected data is deleted from the memory of the kiosk without storing the data at that particular kiosk. In the batch mode, the collected data for each transaction is retained at the kiosk until such time as the kiosk transmits all of collected data at once.

Figure 3:
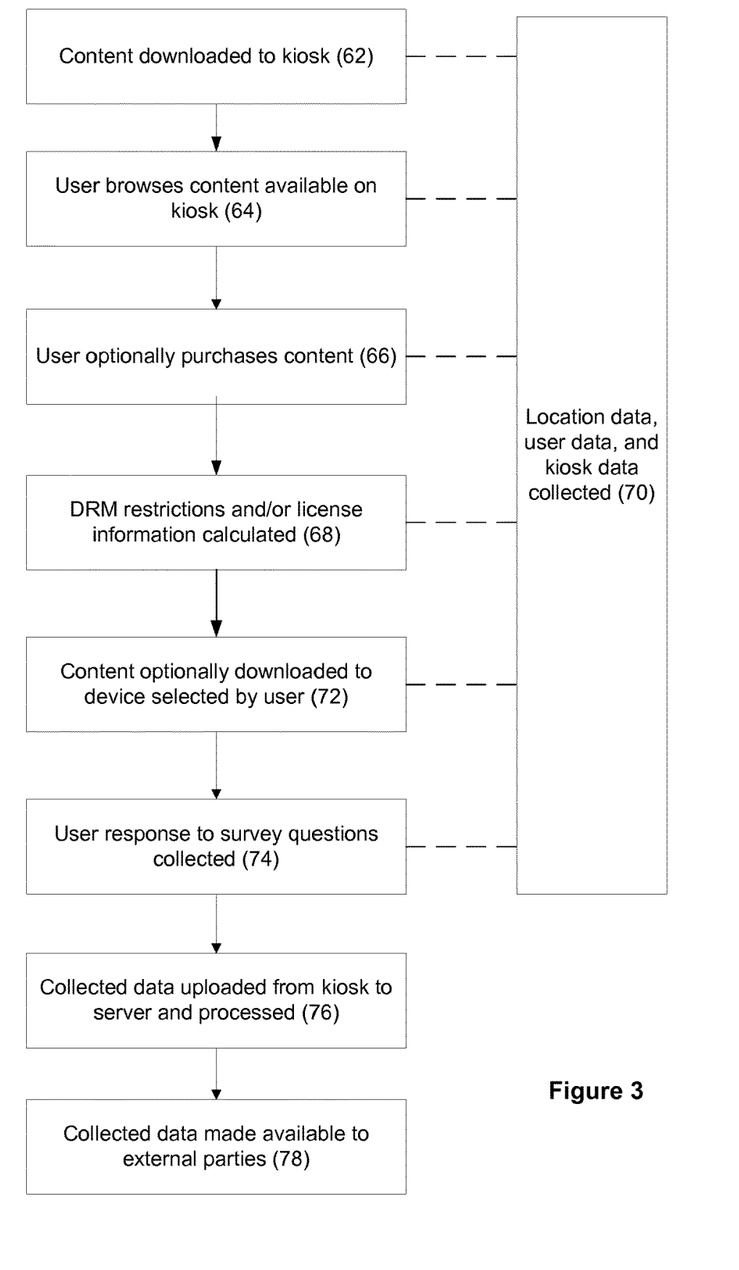
FIG. 3 illustrates some methods for delivering digital content to a user.

One example of a typical user's interaction with the kiosk is illustrated in FIG. 3. Nevertheless, one skilled in the art will appreciate that many variations are possible as to the processes followed by a particular user and that the following process need not be followed sequentially. Block 62 of FIG. 3 shows that if the digital content is not already present at the kiosk, it may be transferred to the kiosk. At block 64 in FIG. 3, the user can optionally view advertising on the first video screen and may optionally begin to use an input device (i.e., touchscreen display) located on or adjacent to the kiosk to navigate among a collection of content that is available for review, rental, or sale via the kiosk. At that point, the user may optionally experience samples of content via the first or second video screen or another output device located on or adjacent to the kiosk. For example, the user can listen to the first 30 seconds of a music file that is available for purchase via the kiosk (or that is available anywhere in the system).

Next at block 66, the user can then optionally select the content to be purchased, typically by paying a purchase price, and entering payment information that is appropriate to the transaction. This payment information can then be verified in real-time. Additionally, the user can take advantage of multiple payment methods, i.e., cash, credit, debit, promotions, loyalty programs, reward programs, etc.

At block 68 in FIG. 3, the method may continue when DRM restrictions and/or license information are calculated as needed and associated with the digital content that was selected for purchase. As shown at block 72, the user can select a receiving device onto which the content 16 will be placed for the user and the content 16 may then be delivered to that device. Then the user may continue to input information during the remainder of the transaction. For instance, block 74 shows that after the user has selected a receiving device for the purchased content, the user may answer a survey or in other way reveal user data, kiosk data, location data, or any other information. This process may optionally be completed while payment information is being authenticated, while content is being downloaded in real-time (if necessary based on the current state of the digital content), and while content is transferred from the kiosk to the selected receiving device.

At any time during the interaction, the kiosk may gather collected data from the user, as illustrated at block 70. The kiosk may gather any desired information (i.e., user data, kiosk data, location data) at any point in the method when that data is available for collection. The kiosk 20 may then assemble the user data, kiosk data, location data, and any other information into the collected data and communicate it to the server 10 (or any other device), as shown at block 76. When the server 10 receives the collected data, it may be optionally collated, analyzed, summarized, or otherwise processed on a server using a variety of procedures. The server 10 may also be configured to use the collected data from one or more kiosks 20 as a factor in determining what content to transfer to each kiosk 20, what advertising messages to display at each kiosk 20, etc.

As depicted at block 78 in FIG. 3, the collected data can then be shared and made available to any external parties of the system. For example, if a community of users has been formed, any desired collected data may be shared among the community, including making the data about a particular community available to a single user or even a non-user of that community. In another example, the collected data can be shared with a content provider 30 or a location provider 40.

The collected data may be communicated to any external party using any known technique. For example, in one technique, communication among a community may be initiated by the user using, for example, instant messaging, blogs, e-mail, EDI, or uploading of data to a separate computer that is accessible to one or more members of the community. In a second technique, the external party may be provided with access to the server 10 on which kiosk data is stored, or another server controlled by the same or an affiliated entity that controls the server. This technique permits the external party to access the collected data at times determined by them. One example of a method by which an external party may access the collected data on a server 10 is via a Web page provided by the entity that controls the server 10. In one embodiment, this Web page may be provided by the same Web server that provides a Web page embodiment of a kiosk 20, with the server 10 providing appropriate information.

The collected data can be shared with the external party by either transmitting the data to them or by allowing them to access the system either directly or indirectly through the Web page/Web portal. In the former situation, the collected data may be optionally collated, analyzed, summarized, or otherwise processed using a variety of steps. This situation may allow the operator of the system to perform the analysis, filter the results, and/or customize the data that is sent to the external party. In the latter situation, the external party can view the collected data before (or as) it is received from the kiosk(s) or anytime during the analysis, filtering, or customization process. Of course, access to the system by the external party can be established using any parameters desired by the operator of the system and/or the individual user that provided the data, i.e., access may be limited to only certain portions of the collected data.

In certain situations, the collected data can be sent directly to other kiosks. Such situations can be advantageous when the external party wants to access data from a group of kiosks in the same location or vicinity (i.e., a primary and a secondary kiosk). In these situations, the data can be transmitted to-or-from the secondary kiosk, allowing the external party to access the collected data for both the primary and the secondary kiosks. This situation may give the external party more access to the raw data that has been collected, but does not necessarily allow the operator of the system to analyze, filter, or customize the report. Again, access to the collected data can be established using any parameters desired by the operator of the system, i.e., access may be limited to only certain portions of the collected data.

In some embodiments, the collected data may be purposefully reported to location partners 40 or content providers 30, including copyright owners. If content providers, copyright owners, or others are due royalties or other payments based on use or sale of content, such royalties or other payments may be made from the operator of a server to the appropriate recipient using automated means as are known in the art, based upon sales and demographic data. A system operator can also authorize any third party to receive reports and restrict the reports that the third party can access.

All of the collected data from the distribution device(s), Web portal, and/or Web page can be used for numerous purposes. In some aspects, the collected data can be used to enhance and/or customize the operation of the system. In other aspects, the collected information can be part of the general and specific market research data that can be used by the operator of the system as known in the art. In yet other aspects, the collected information can be used to customize the content and/or the advertising provided to the external party. For example, the collected data can be used to customize the content delivered to the kiosk or be used to predict the types/genre of media that will be popular to a given user. Alternatively, the collected data can be used to customize the digital content by the time of day, the geographic location, etc.

The collected data can be used to customize the advertising directed to the user. The advertising may include messages used to market, promote, or sell products or services; or to enhance brand recognition, as well as training materials, entertainment content, community or location information, and other similar materials. The advertising may also include video clips, audio clips, ring tones, printed coupons, promotional codes, brochures, literature, images, giveaways, discounts associated with digital content, or other promotional or brand-related content. In some embodiments, the advertising may be presented through video and/or audio presentations, animated PowerPoint presentations, flash programs, banners, pop-ups, screen-savers, wallpapers, posters, digital sampling, cost-per-pixel, cost-per-click, advertisement images, printed advertisements, trademarks and other similar advertisements. One example of the advertising includes the promotion of artists or performers, whose products or content are available for sale on the kiosk. In still another example of the use of the collected data, it may be used in any method of viral marketing.

The user does not need to physically present at a kiosk to interact with it. The user can interact with the kiosk via a Web page or Web portal that is in communication with the system 5. In some embodiments, this communication can comprise a wired connection, such as a user accessing the Web page or Web portal via a desktop computer. In other embodiments, though, the communication can comprise a wireless connection, such as a user accessing the Web page or Web portal via a portable electronic device, like a laptop computer, a cellular telephone, or other portable electronic device.

In some instances, the portable electronic device can have a GPS (global positioning system) receiver or another global navigation system, such as the partially complete Russian GLONASS system, the upcoming European Galileo positioning system, the proposed COMPASS navigation system of China, and/or the IRNSS of India. This system enables a GPS receiver to determine the location, speed, direction, and time of the user when he is communication with the satellites that are part of the GPS system.

With the portable electronic device, a user can access the system 5 and interact with a kiosk in any location where the needed wireless signal exists. Thus, in these embodiments, the user is not limited to fixed locations (like being physically present at the kiosk or sitting at a desktop computer at the user's home) in order to interact and/or purchase content from the kiosk. Removing such a limitation allows the user to not only interact and/or purchase content in any location, but also at times which are more convenient to the user.

Figure 4:
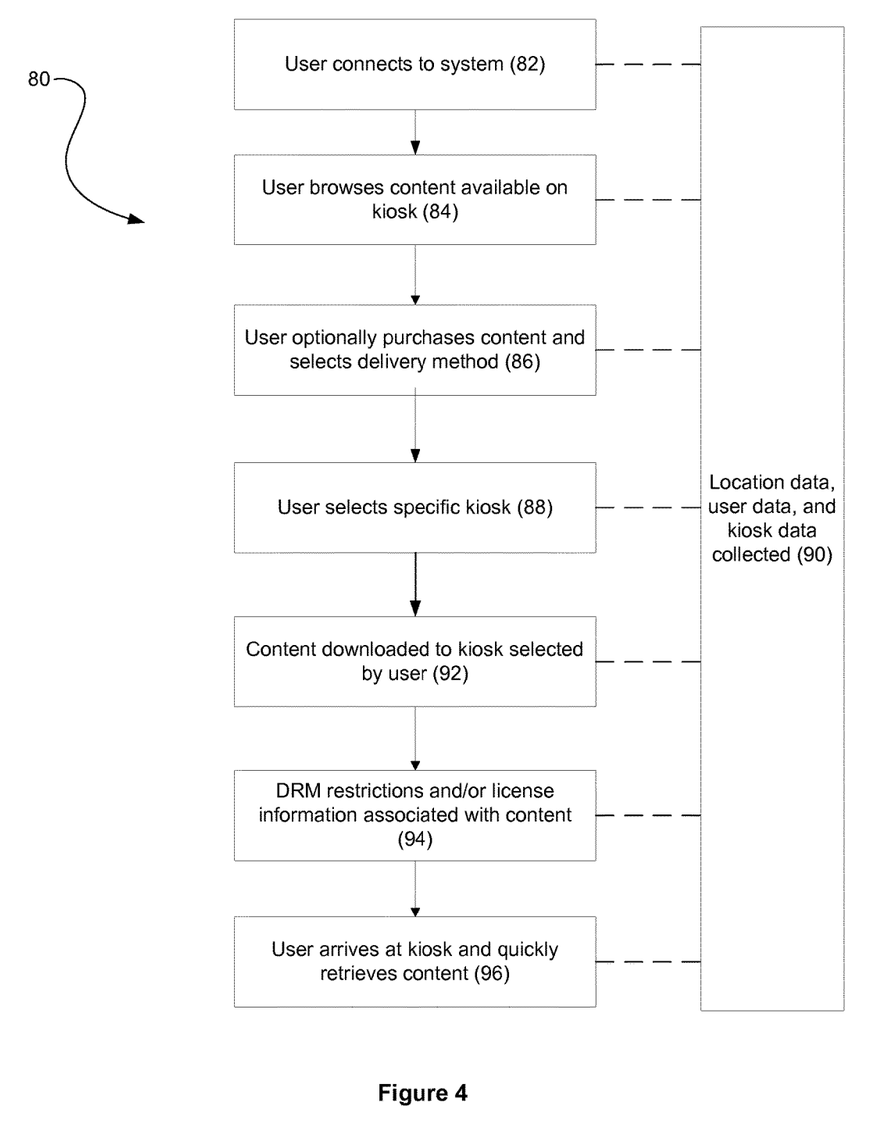
FIG. 4 illustrates other methods for delivering digital content to a user.

An example of the user's interaction with the system (and potential purchase of digital content) using a wireless connection with a portable electronic device containing a GPS receiver is shown in FIG. 4. Nevertheless, one skilled in the art will appreciate that many variations are possible as to the processes followed by a particular user and that the process illustrated need not be followed sequentially. The process 80 begins in block 82 of FIG. 4 when the user connects to the system using the wireless connection in the portable electronic device as known in the art, such as a Wi-Fi communication from a user's MP3 player device. The user can be in a fixed location or can be moving when connecting to the system. When in a fixed location, the user is not necessarily limited to access using a portable electronic device.

Once connected to the system, the user can view any digital content in the system via the Web page or via the Web portal or wifi directly to their MP3 player device that is displayed on the portable electronic device. The user can optionally view advertising and navigate among a collection of content that is available for review, rental, or sale. The user may optionally experience samples of the digital content via the Web page or via the Web portal. For example, the user can view the first 30 seconds of a video file that is available for rental.

The system can contain a user-friendly website portal to facilitate this interaction. The website portal permits a user to browse both new and old digital content, search for content by query, read reviews and recommendations from critics and other users, locate a kiosk based on its geographical location, and enroll as a member. Of course, members are able to do all of the foregoing tasks, and are able to modify their preferences, alter or cancel their membership, and view special members-only information. Members can also be greeted by a customized homepage which is personalized for each member based on their preferences and viewing habits.

Next, as shown at block 86, the user can then optionally select the content to be purchased, typically by paying a purchase price, and entering payment information as appropriate to the transaction. This payment information can then be verified in real-time. The user can take advantage of multiple payment methods, i.e., cash, credit, debit, promotions, loyalty programs, reward programs, etc. In some instances, the user need to pay for the content since it might be offered for free, for example, in exchange for the user's participation in a survey (or other advertising model), in exchange for digital content that the user owns that is not in the system and that can be uploaded, or even in exchange for the user's own content that he has created. In some embodiments, rather than purchasing the content, the user can save the search (and/or any other desired information) that can then be recalled quickly when the user arrives at the kiosk.

As illustrated at block 88, the user can then select the kiosk to which the purchased content will be delivered. This process can be carried out using the GPS receiver in the portable electronic device. The GPS receiver communicates with the various satellites in the GPS system to determine the current location of the user when interacting with the system. That information is then compared with the information in the system 5 about the locations of the kiosks that either currently contain the purchased content or the kiosks to which the digital content can be delivered. This process might require a comparison between the current location of the user and whether the digital content can be transferred to the desired (often the closest) kiosk by the anticipated time the user could arrive at the kiosk. If desired by the user, the directions for arriving at the desired kiosk from the current location of the user can then be provided by the GPS system and either displayed on the portable electronic device or sent to the user via email.

As illustrated at block 92, the method continues when the desired digital content is transferred from the server 10 to the desired kiosk. In some instances, the transfer can be made from one kiosk to another, rather than from the server to the kiosk. Next, as shown by box 94, the DRM restrictions and/or license information are calculated as needed and associated with the digital content that was selected by the user.

When the user arrives at the kiosk, the user has several options. First, if the search was merely saved (rather than the purchase being made), the user can then recall the saved search and continue with the interaction process. Second, if the desired digital content was purchased, but the form for delivery was not selected (i.e., recorded onto a CD as opposed to merely being available to be transferred to a user's MP3 player), the user can then select the delivery mechanism and the content 16 may be delivered to the desired receiving device. And if the content has been purchased and the delivery mechanism selected, as shown in block 96, the user can merely retrieve the purchased content. In some instances, the receiving device can be the same device as the user's portable electronic device that was used to purchase the content or the content could be delivered to a CD or DVD or other storage medium.

At any time during the interaction, the system may gather collected data from the user, as illustrated at block 90. The system may gather any desired information (i.e., user data, kiosk data, location data) at any point in the method when that data is available for collection. In these embodiments, the system may also gather the time between when a user interacted and/or purchased digital content and arriving at the desired kiosk. This additional information can be used to lessen waiting times for users when retrieving digital content from a desired kiosk, as well as provide marketing information about the user.

Although not depicted in FIG. 4, the kiosk 20 may then assemble the user data, kiosk data, location data, and any other information into the collected data and communicate it to the server 10 (or any other device). As well, although not depicted in FIG. 4, the collected data can then be shared and made available to any external parties to the system.

This method diminishes the waiting times at kiosks because some, if not all, of the user's browsing of the digital content available need not be performed right at the kiosk. Thus, more users are able to interact with the kiosk in a given amount of time. As well, the waiting times can be diminished since a user does not need to wait at the kiosk after the selected content has been purchased (i.e., while it is transferred to the kiosk after it has been selected during the browsing process). Instead, the selected content can be transferred during the time the user is traveling to the desired kiosk.

The methods and systems described above may have any desired variation. For instance, in one variation, a user can interact with a kiosk 20 to select and purchase content, but selects a delivery location that is not co-located with the kiosk 20 at which the original interaction and purchase occurred (the "delivery location"). As one example, a user could interact with a server using a Web page embodiment of a kiosk 20 and then select a separate kiosk 20 having a CD-burning output device as the delivery location. As a second non-limiting example, a user could interact with a server 10 via a first kiosk 20 having two video displays and a CD burner, but then discover that the preferred delivery mechanism, an audio CD, was unavailable because all blank audio CDs at that particular kiosk 20 had been used. The user could then select as the delivery location a kiosk 20 located in another building on the same campus where blank audio-CDs were available; or the user could select a Web page embodiment as the delivery location and a download to hard disk as the delivery mechanism.

In another variation, the entity that operates a server 10 or kiosk 20 may receive a fee or services in exchange for its part in the collection and sharing of information. In another variation on the systems and methods described above, a first device comprises a kiosk and the second device comprises a peripheral that may optionally be located remotely from that kiosk. In some embodiments, several kiosks may be networked together to act as distribution nodes in a distribution chain.

In still another variation, multiple kiosks 14 may be linked in a manner such that purchases are completed on one or more kiosks 20 but the delivery location for all such purchases is a designated delivery device located on a specific kiosk 20. As one example, a retail establishment could maintain multiple kiosks 14 at which customers could browse available content. After purchase of content through any of those multiple kiosks 14, all customers would collect an audio CD, DVD video disk, or other device from a separate kiosk 20 that was designed for high-volume generation of such devices.

In addition, the interaction with the kiosk experience can be customized for each kiosk's location. For example, the kiosk can be customized for a demographic in that location where it is located. In this example, if the kiosk is located in a demographic with a large number of Spanish speaking users, the interface, digital content stored at the kiosk, and any other operating parameter can be customized for a Spanish speaking user.

The kiosks may also vend or offer additional services including services allowing an upload of data for storage. For example, a vending machine may allow a user's camera full of pictures to upload the pictures stored on the camera, have them stored in the system and then retrieved later either through a kiosk or by transferring them via the web portal.

In other variations, the payment for the digital content could be made while the user is located at the kiosk, but the digital content can be delivered in another location. Thus, for example, the user can purchase in one location and retrieve the digital content in another location. These other locations include another kiosk or even an electronic device at another location, such as a desktop computer located at the user's home or office.

In other variations, the user who retrieves the digital content can be different than the user who selects and/or pays for the content. For example, a first user select digital content from a first kiosk and a second user could take delivery of that content at a second kiosk. Thus, the first user could select and optionally purchase content while in New York and the second user who is traveling in Los Angeles could go to a kiosk and take delivery of that content there after proper verification and/or identification procedures at the second kiosk.

In addition to any previously indicated variation, numerous other modifications and alternative arrangements may be devised by those skilled in the art without departing from the spirit and scope of the invention and appended claims are intended to cover such modifications and arrangements. Thus, while the invention has been described above with particularity and detail in connection with what is presently deemed to be the most practical and preferred aspects of the invention, it will be apparent to those of ordinary skill in the art that numerous modifications, including but not limited to, form, function, manner of operation and use may be made without departing from the principles and concepts set forth herein.

The invention claimed is:

1. A computerized method for distribution of digital content to a user device from one of a plurality of distribution devices, the computerized method comprising:
   wirelessly receiving, from the user device, a request to purchase digital content selected from a plurality of available digital content, a selection of a first distribution device from the plurality of distribution devices, and a current location of the user device;
   determining, when the request is received, whether the requested digital content is stored at the selected first distribution device;
   determining that the requested digital content is not stored at the selected first distribution device;
   comparing the current location of the user device with the location of the selected first distribution device;
   guiding a user via the user device from the current location of the user device to the location of the first distribution device;
   transmitting the requested digital content to the first distribution device while the user is traveling from the current location of the user device to the location of the first distribution device; and
   instructing the first distribution device to transmit the requested digital content to a web portal, and then from the web portal to the user device.

2. The computerized method of claim 1 further comprising providing, to the user device, directions to the physical location of the first distribution device from the current location of the user device.

3. The computerized method of claim 1 further comprising instructing a second distribution device to provide the requested digital content to the first distribution device.

4. The computerized method of claim 1 wherein wirelessly receiving the current location of the user device comprises wirelessly receiving Global Positioning System location data of the user device.

5. The computerized method of claim 1 further comprising instructing the first distribution device to transmit the requested digital content to the user device at a specified time.

6. The computerized method of claim 1 further comprising instructing the first distribution device to wirelessly transmit the requested digital content to the user device.

7. The computerized method of claim 1 further comprising instructing the first distribution device to transmit the requested digital content to the user device after connection of the user device to the first distribution device.

8. The computerized method of claim 1 further comprising:
   wirelessly receiving user specific information from the user device; and wirelessly transmitting, to the user device, advertising information based on the received user specific information.

9. The computerized method of claim 1 further comprising:
   wirelessly receiving user specific information from the user device; and
   wirelessly transmitting to the user device customized digital content for purchase based on the user specific information.

10. The computerized method of claim 1 further comprising: wirelessly receiving, from the user device, a search query; storing the search query; and transmitting the search query to the first distribution device.

11. The computerized method of claim 1 further comprising:
   receiving instructions from a content provider;
   generating digital rights management information based on usage instructions from the content provider; and
   associating the digital rights management information with the requested digital content.

12. The computerized method of claim 1 where transmitting the requested digital content to the first distribution device and receiving the requested digital content at the first distribution device prior to the user's arrival comprises transferring the requested digital content from another distribution device to the first distribution device.

* * * * *